United States Patent [19]

Schultz et al.

[11] Patent Number: 4,724,879

[45] Date of Patent: Feb. 16, 1988

[54] CENTRAL TIRE INFLATION SYSTEM

[75] Inventors: Gary R. Schultz, Novi; David M. Preston, Madison Heights, both of Mich.

[73] Assignee: Eaton Corporation, Cleveland, Ohio

[21] Appl. No.: 617,646

[22] Filed: Jun. 4, 1984

[51] Int. Cl.⁴ .................................................. B60C 29/00
[52] U.S. Cl. ................................. 152/416; 137/224; 152/379.5; 152/427
[58] Field of Search ............... 152/415, 416, 417, 427, 152/158, 513, 520, 379.5, 379.3; 137/859, 102, 224, 226, 225, 510; 303/7, 20, 100, DIG. 1, DIG. 2; 141/95, 197; 73/146.2, 146.5

[56] References Cited

U.S. PATENT DOCUMENTS

| | | | |
|---|---|---|---|
| 2,452,527 | 10/1948 | Peter | 152/417 |
| 2,634,781 | 4/1953 | Turek | 137/224 |
| 2,634,782 | 4/1953 | Turek et al. | 152/417 |
| 2,634,783 | 4/1953 | Turek et al. | 152/417 |
| 2,634,784 | 4/1953 | Fitch | 152/417 |
| 2,976,906 | 3/1961 | Kamm et al. | 152/417 |
| 2,989,999 | 6/1961 | Holbrook et al. | 152/416 |
| 3,099,309 | 7/1963 | Horta et al. | 152/416 |
| 3,102,573 | 9/1963 | Winsen et al. | 152/416 |
| 3,276,502 | 10/1966 | Ruf | 152/417 |
| 3,276,503 | 10/1966 | Kilmarx | 152/417 |
| 3,314,440 | 4/1967 | Horowitz | 137/226 |
| 3,760,859 | 9/1973 | Shahan et al. | 137/224 X |
| 3,850,220 | 11/1974 | Mitchell | 152/513 X |
| 4,059,138 | 11/1977 | Mirtain et al. | 152/520 X |
| 4,106,543 | 8/1978 | Sano | 152/427 X |
| 4,203,467 | 5/1980 | Cardi | 152/415 X |
| 4,212,334 | 7/1980 | Dudar | 137/224 X |
| 4,313,483 | 2/1982 | Brockmann | 152/416 |
| 4,418,737 | 12/1983 | Goodell et al. | 152/416 |
| 4,421,151 | 12/1983 | Stumpe | 152/417 |
| 4,434,833 | 3/1984 | Swanson et al. | 152/417 |
| 4,437,504 | 3/1984 | Stumpe | 152/427 |

FOREIGN PATENT DOCUMENTS 1375258  9/1964  France ........................ 137/859

Primary Examiner—Donald E. Czaja
Assistant Examiner—Ramon R. Hoch
Attorney, Agent, or Firm—D. A. Rowe; H. D. Gordon

[57] ABSTRACT

A tire valve assembly (300) for a central tire inflation system (10) comprising a single valve body (302) having only a first (304) and a second (306) fluid connection from the exterior to the interior thereof is provided. The first fluid connection comprises a first port (304) connected to a selectively pressurized and exhausted conduit (52) and the second fluid connection comprises a second port (306) connected to the interior pressurized chamber (74) of an inflatable tire (12). The assembly includes first valve means (314) responsive to pressurization and exhausting of said selectively pressurized and exhausted conduit to establish or block, respectively, fluid communication between said first and second ports and second valve means (316) responsive to pressurization in said interior tire chamber to maintain said first valve means in the closed position thereof if said interior tire chamber is pressurized below a predetermined reference pressure. As the valve assembly is provided in a single valve body and requires no venting to atmosphere other than through the first port (304), the valve assembly may be mounted within the interior pressurized tire chamber (74) such as within a pocket (404) provided in an annular sleeve type bead lock (400).

5 Claims, 15 Drawing Figures

CENTRAL TIRE INFLATION SYSTEM

BACKGROUND OF THE INVENTION

1. Field of the Invention

The present invention relates to central tire inflation systems (CTIS), also known as onboard inflation systems and tire traction systems, wherein the inflation pressure of one or more vehicle tires may be controlled from a remote location (usually the vehicle cab) with the vehicle at rest and/or in motion and utilizing an onboard source of pressurized fluid (usually compressed air from the vehicle air brake compressor and/or a compressed air reservoir). In particular, the present invention relates to a valve assembly mountable at the tire rim, or within the tire rim, which is vented only through the single conduit connecting same to the system control valves, which is effective to open and close in response to fluid pressure in the single conduit and which is effective to automatically fluidly isolate a tire when the pressure to which the tire is inflated is less than a minimum reference pressure.

2. Description of the Prior Art

Central tire inflation systems, also known as tire traction systems, are well known in the prior art as may be seen by reference to U.S. Pat. Nos. 2,634,782; 2,976,906; 2,989,999; 3,099,309; 3,102,573; 3,276,502; 3,276,503; 4,313,483; 4,418,737, 4,421,151 and 4,434,833, the disclosures of all of which are hereby incorporated by reference. CTIS allow the operator to remotely manually and/or automatically vary and/or maintain the inflation pressure of one or more of the vehicle tires from the vehicle (usually a truck) air system, usually while the vehicle is in motion as well as when the vehicle is at rest.

It is well known that the traction of vehicles on relatively soft terrain (i.e. on mud, sand or snow) may be greatly improved by decreasing the inflation pressure within the tires. By decreasing the inflation pressure, the tire supporting surface (usually called the "footprint") will increase thereby enlarging the contact area between the tires and the terrain. Additionally, it is often desireable to decrease the tire pressure from the over-the-road or highway inflation pressure to increase riding comfort on rough roads. On the other hand, higher tire pressures decrease rolling resistance and tire carcass temperatures on smooth roads thereby increasing economy and safety. Accordingly, in cross country vehicles it is desireable to change the inflation pressure in the pneumatic tires to fit the terrain and is also desireable that a system be provided for changing the inflation pressure of the tires from an onboard source, while the vehicle is at motion or at rest and that the system be controlled from the vehicles operating cab. This is especially true for military vehicles which usually travel in columns whereby stoppage of the vehicle would delay the entire column. Additionally, if the military is under enemy attack, it is imperative that the vehicle maintain its maneuverability as long as is possible. If a tire has been damaged by gun fire or the like, it is desireable to be able to at least partially inflate the damaged tire, if possible, so that the vehicle remains mobile.

While CTIS are known in the prior art and have been utilized by the U.S. Army since at least World War II, the prior art systems are not totally satisfactory as the systems utilize conduits, valves and/or seals which were located at exposed locations rendering same vulnerable to damage over rough terrain, utilize valves and/or conduits which required venting at the wheel hub location thus exposing same to malfunction as a result of clogging due to water, mud, snow or the like, do not provide for automatic isolation of a vehicle tire subject to extreme damage, subject the rotary seal members to a differential pressure during steady state operating conditions thereby decreasing the life thereof and increasing the likelihood of leakage, and/or require drilling of passages in the axle housing and/or hub assemblies which may tend to weaken same and/or render retrofit of a CTIS to an existing vehicle more difficult and costly.

SUMMARY OF THE INVENTION

In accordance with the present invention, the drawbacks of the prior art have been minimized or eliminated by the provision of a central tire inflation system utilizing rotary seals which are located in a well protected inboard location (see U.S. Pat. No. 4,434,833 assigned to the Assignee of this invention), utilizing valves and conduits of a relatively rugged proven construction which may be located inside the vehicle tire to protect same, utilizing valving means which will automatically isolate a tire having less than a predetermined minimum reference pressure from the remainder of the system, utilizing valves and/or conduits which require no venting to atmosphere at the vehicle wheel assembly and which provides all venting of the system at a location on the vehicle chassis above the vehicle fording level, utilizing valve operation which will exhaust internal pressure on the rotary seals during steady state operation of the system, and requires only a single drilled opening in the wheel hub assembly to facilitate retrofitting of the system to an existing vehicle.

The above is accomplished by providing a central tire inflation system for a vehicle utilizing a valve assembly comprising a control valve and a low tire pressure shutoff valve at each wheel end assembly (usually a single or dual tire) which valve assembly is connected to the central control system by a single pressure line or conduit through a rotary seal assembly and pressurization of which single pressure conduit is effective to open and close communication to the vehicle tire and to cause inflation and/or deflation of said tire to a selected pressure. All system venting of the tires and the valve assembly is through the single pressure line or conduit and no provision for system venting of the tires and/or valve assembly at the wheel end is required.

The valve assembly which may be formed in a single valve body having only two ports, one connected to the interior of the tire and the other to the system supply conduit, may be located exteriorly of the tire or may be located interiorly of the tire such as in the bead lock portion thereof. The low tire pressure shutoff valve is effective to automatically isolate the tire associated therewith from the remainder of the central tire inflation system when the inflation pressure thereof is below a predetermined minimum reference value.

The single pressure conduit leading to the rotary seal at the wheel hub assembly is connected to a source of pressurized fluid through a plurality of control valves which are effective to open communication to the tire to measure the existing pressurization thereof, to cause inflation or deflation of the tire as required, to establish or block communication to the tire from the central tire inflation system and to exhaust the single pressure line during steady state conditions of the tire inflation system and to relieve pressure on the rotary seals. Preferably, the control valves, which may be separate or provided in a single valve block, are operated by a control, preferably a microprocessor control, which senses the tire inflation value selected by the operator, senses vehicle volicity and the current pressure condition of the vehicle air brake system and the inflation system reservoir.

Accordingly, it is an object of the present invention to provide a new and improved central tire inflation system.

A further object of the present invention is to provide an improved central tire inflation system utilizing a valve assembly, preferable in a single valve body having a single connection to the tire chamber and single connection to the source of exhaust and pressurized fluid, which requires no venting other than through the single supply conduit, is effective in response to pressurization and venting of the supply conduit to open and close communication to the tire, and to isolate the tire if inflation pressure thereof falls below a minimum reference pressure.

These and other objects and advantages of the present invention will become apparent from a reading of the following description of the preferred embodiments taken in connection with the attached drawings.

DESCRIPTION OF THE PREFERRED EMBODIMENT

Figure 1:
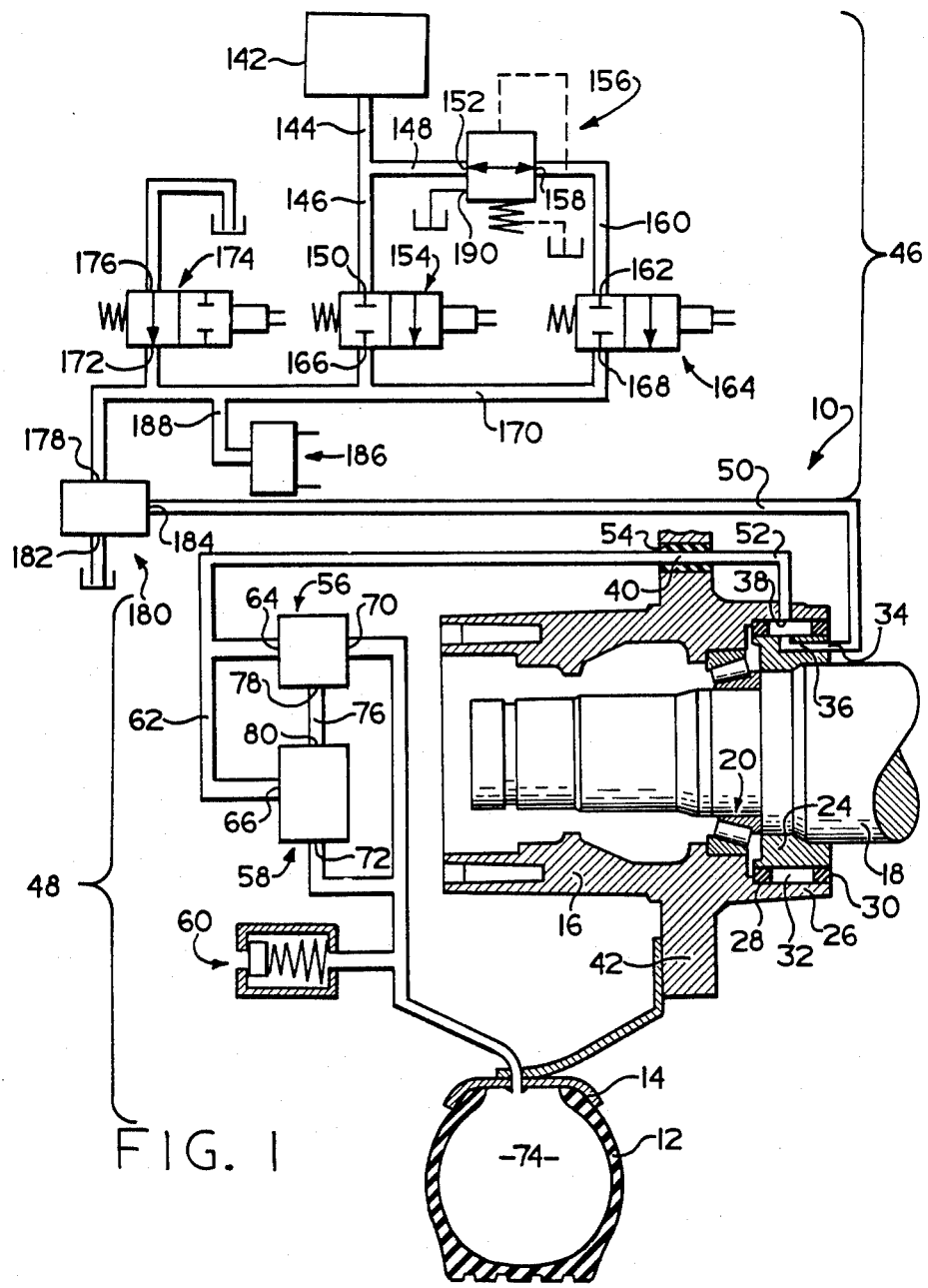
FIG. 1 is a schematic illustration of the pneumatic components of the present invention as utilized to control the inflation of a single tire.

In the following description of the present invention, certain terms will be utilized for purposes of reference only and are not intended to be limiting. The terms "upward", "downward", "rightward" and "leftward" refer to directions in the drawings to which reference is made. The terms "inward", and "outward", respectively, refer to directions towards and away from, respectively, the geometric center of the device described. The terms "inflation" and "deflation", respectively, refer to increased and decreased, respectively, pressurization of a tire or the like. Said terminology will include the words above specifically mentioned, derivatives thereof and words of similar import.

Figure 5:
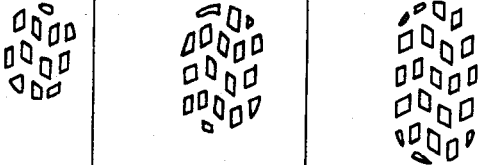
FIG. 5 is a diagrammatic representation of tire imprints at different tire inflation pressures.

The advantages of varying the inflation pressure of the pneumatic tires (especially the driven tires) of a vehicle, especially a relatively heavy duty vehicle, in accordance with the terrain over which the vehicle is traveling are well known in the prior art and may be appreciated by reference to FIG. 5. Assuming, for example, the vehicle rear drive axle tires are normally inflated to about 75 psi (pounds per square inch) for highway operation, decreasing the tire inflation pressure to about 30 psi for cross country travel over rough road or to about 20 psi for operation in sand, mud or snow conditions will result in the tire having a greater contact area, (i.e. footprint), and improved traction. In addition to improved traction at lower tire inflation pressure, the vehicle will be able to maintain a higher speed over poor ground, and reduce wear and tear on the vehicle, because of the smoother ride over "washboard" type terrain. Conversely, to reduce operating temperature and wear and tear on the tires at highway speed, a higher tire inflation pressure is desired. Of course, to increase mobility, it is highly desireable that the tire inflation pressures be controllable from the vehicle cab from an onboard source of pressurized fluid and be variable and maintainable with the vehicle in motion as well as when the vehicle as at rest. It is also highly desireable that the inflation pressure of the vehicle tires be variable and measurable independently of the central tire pressure inflation system for rapid checking and increasing or decreasing of the tire inflation pressure. This is especially desireable for initial inflation of the tires.

The pneumatic components of the central tire inflation system 10 as utilzed to control the inflation pressure of a single tire 12 may be seen by reference to FIGS. 1–4. The state of pressurization of the various conduits and the positions of the various valves illustrated in FIGS. 1–4, in the various modes of operation of system 10, may be seen by reference to FIGS. 6–11.

Inflatable tire 12 is mounted to a tire rim 14 which is fixed to a wheel hub assembly 16 rotationally supported on the outer end of an axle housing 18 by means of bearings 20. An axle shaft (not shown) rotationally driven by conventional means, such as a differential (not shown), extends from the axle housing 18 and typically includes a flange (not shown) for drivingly connecting the axle shaft to the wheel hub. As may be seen in greater detail by reference to U.S. Pat. No. 4,434,833, assigned to the Assignee of this invention, an annular sleeve 24 may be pressed to the axle housing at a location inboard of the bearings 20 and the wheel hub may define and inboardly extending sleeve-type annular flange 26 telescopically surrounding sleeve 24. A pair of rotary seals 28 and 30 extend radially between the outer periphery of sleeve 24 and the inner periphery of sleeve-type flange 26 to define an annular sealed chamber 32 therebetween. Sleeve 24 is provided with an inlet 34 and a passage 36 opening to the chamber 32. Sleeve-type flange 26 is provided with a generally radially extending passage 38 extending from the sealed annular chamber 32 to the exterior outer diameter surface thereof. A single passage 40 may be provided in the radial flange portion 42 of the wheel hub 16 for passage of a pressure conduit. The above construction is described in above mentioned U.S. Pat. No. 4,434,833 and forms no part of the present invention. It is understood, of course, that the present invention is equally applicable to wheel hub/axle housing assemblies (also called "wheel-end assemblies") of other constructions.

The central tire inflation system 10 may be considered to comprise two components, a stationary component 46 fixed to the vehicle chassis and a rotational component 48 rotationally fixed to the wheel hub 16 and tire 12. The stationary component 46 is fluidly connected to the rotational component 48 by means of the annular chamber 32 defined by the rotary seals 28 and 30. Briefly, fluid conduit 50 from the stationary component 46 is fluidly connected to the inlet 34 of passage 36 formed in sleeve 24 while fluid conduit 52 leading to the rotational component 48 is fluidly connected to the passage 38 formed in sleeve-type flange 26 and passes through the opening 40 defined in the flange 42 of the hub 16. To protect conduit 52, a grommet or bushing 54 may be provided in the opening 40 or opening 40 may be defined by a bore in a wheel stud. Of course, alternatively, a passage may be provided in hub 16 opening to the outboard side thereof. It may thus be seen that attachment of system 10 to a wheel end assembly requires no drilling of the axle housing 18 and drilling of only a single hole 40 through radial flange 42 of the wheel hub 16. Accordingly, initial installation and/or retrofit of system 10 to a vehicle is considerably simplified and will not weaken the load supporting structures of the axle housing and wheel hub. It is also noted that the rotary seals 28 and 30 and the conduit 50 leading to the wheel end assembly may be located at an inboard relatively protected location on the vehicle.

Rotating component 48 of system 10 includes a low pressure shutoff valve 56, a control valve 58 and a manual inflate and pressure check valve 60. Low pressure valve 56 and control valve 58 may be formed integrally and/or may be located interiorly of tire 12.

A manifold portion 62 of conduit 52 interconnects ports 64 and 66 of valves 56 and 58, respectively, with one another and with the conduit 50 via chamber 32 while a manifold conduit 68 interconnects ports 70 and 72 of valves 56 and 58, respectively, the manual inflate and check valve 60, and with the interior chamber 74 of the inflatable pneumatic tire 12. A conduit 76 interconnects ports 78 and 80 of valves 56 and 58, respectively. If dual tires are utilized, manifold conduit 68 may be split downstream of the valve 60 and manual shut-off valves provided to isolate the tires if required.

Figure 3:
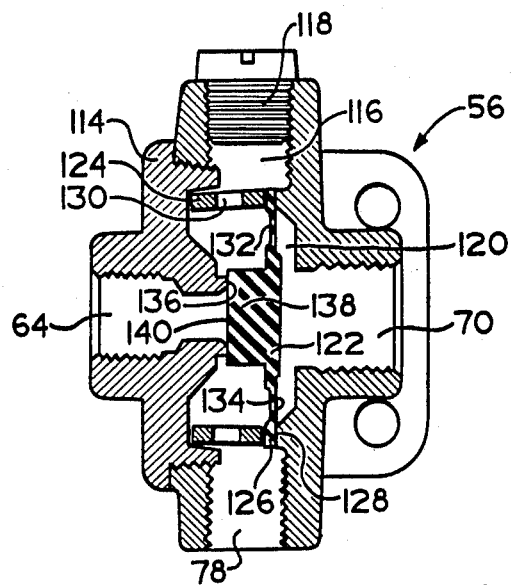
FIG. 3 is a sectional view of the low tire pressure shutoff valve schematically illustrated in FIG. 1.
Figure 2:
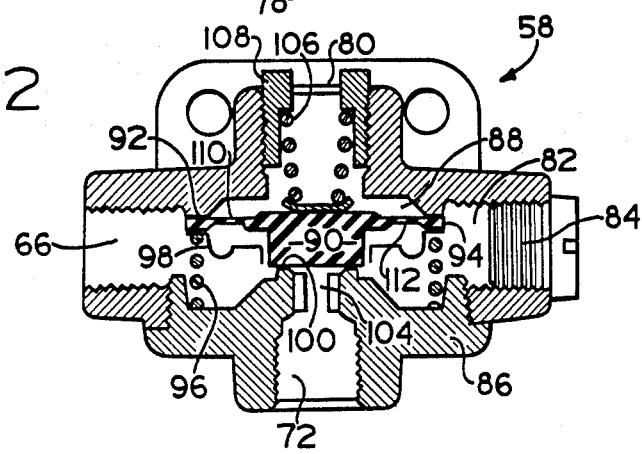
FIG. 2 is a sectional view of the control valve schematically illustrated in FIG. 1.

The detailed structure and operation of control valve 58 and low tire pressure shutoff valve 56 may be seen by reference to FIGS. 2-3, respectively. While the structure of the various valves utilized in the subject invention will be described with a certain degree of detail, it is understood that valves and/or combinations of valves performing the same function, but of a different structure, may be substituted therefor. It is also understood that while the various conduits and passageways are illustrated as a one piece construction, multi-piece construction may be substituted therefor.

As may be seen by reference to FIG. 2, control valve 58 is a diaphragm valve which, in an attempt to utilize commercially available, proven components, is a modified truck air brake quick-release valve of the type sold by Berg Manufacturing Company as Part No. AC15793. The valve 58 defines four ports, port 66 connected to manifold portion 62 of conduit 52, port 72 connected to manifold conduit 68, port 80 connected to conduit 76 and an inoperative port 82 sealed by a plug 84. Valve 58 includes a body 86 defining a central chamber 88 in which a plug type diaphragm 90 is received. The valve body 86, which may be a multi-piece structure, defines a first annular valve seat 92 sealed by the outer periphery 94 of the diaphragm 90 for controlling fluid communication between ports 80 and 66. A spring and spring retainer 96 and 98, respectively, urges the outer periphery 94 of diaphragm 90 into sealing engagement with the annular valve seat 92. The valve body 86 also defines an annular valve seat 100 normally engaged by the plug portion 102 of the diaphragm 90 to control fluid communication between ports 66 and 72. A sleeve 104 is received in port 72 to provide a reduced orifice therethrough. A spring 106 and spring seat 108 are provided to bias the plug 102 into sealing engagement with seat 100 as will fluid pressure at port 80 acting on the upper surface 110 of diaphragm 90 which is of greater area than the under surface 112 thereof. The reduced orifice allows the use of a smaller biasing spring 106.

Spring 106 biases plug 102 against valve seat 100 against a pressure in port 72 (connected to the tire 12 via conduit 68) of about 100 psi, thus, limiting maximum tire pressure to 100 psi. Of course, other maximum tire pressures may be selected. Should tire pressure exceed the maximum pressure, plug 102 will move off of seat 100 communicating ports 72 and 66 allowing the excess tire pressure to be relieved in a manner to be described below. Excessive tire pressure can occur due to improper filling through the manual inflate valve 60 and/or as a result of excessive operating temperatures of the tire 12. A pressure of about 10-20 psi at port 66, assuming port 80 is vented, acting on the under surface 112 of diaphragm 90 will lift the plug member 102 off of the seat 100 communicating ports 72 and 66 for establishing fluid communication between the tire and the seal chamber 32. As pressure at port 66 drops to below about 7 psi, spring 106 will again cause plug 102 to sealingly engage seat 100 to close the control valve. Accordingly, at less than about 7 psi pressure in conduits 50 and 52, the control valve 58 will be closed and at pressures above 10-20 psi, the control valve will be open between ports 66 and 72.

The low tire pressure shutoff valve 56 is illustrated in FIG. 3 and comprises a modified truck air brake system quick-release valve of the type available from Berg Manufacturing Company as Part No. AC15793, as is the control valve 58 described above. Low pressure shutoff valve 56 includes a valve body 114 defining four ports, port 64 connected to manifold portion 62 of conduit 52, port 70 connected to the interior chamber 74 of tire 12 via manifold conduit 68, port 78 connected to port 80 of valve 58 via conduit 76 and an unused port 116 sealed by plug 118. Valve body 114 also defines an interior chamber 120 in which a plug type diaphragm 122 is received. Valve 56 is modified by removal of the normally present diaphragm spring and replacement thereof by a sleeve member 124 which will rigidly hold the outer periphery 126 of the diaphragm 122 against the valve seat 128. Accordingly, port 70 is positively isolated from ports 64 and 78. Sleeve member 124 is provided with one or more apertures 130 to provide fluid communication between ports 64 and 78 and between port 78 and the under surface 132 of diaphragm 122 which is smaller in area than the upper surface 134 of diaphragm 122. Valve body 114 defines an annular valve seat 136 sealingly engageable by the plug portion 138 of the diaphragm 122 to control fluid communication between ports 64 and 78.

Figure 9:
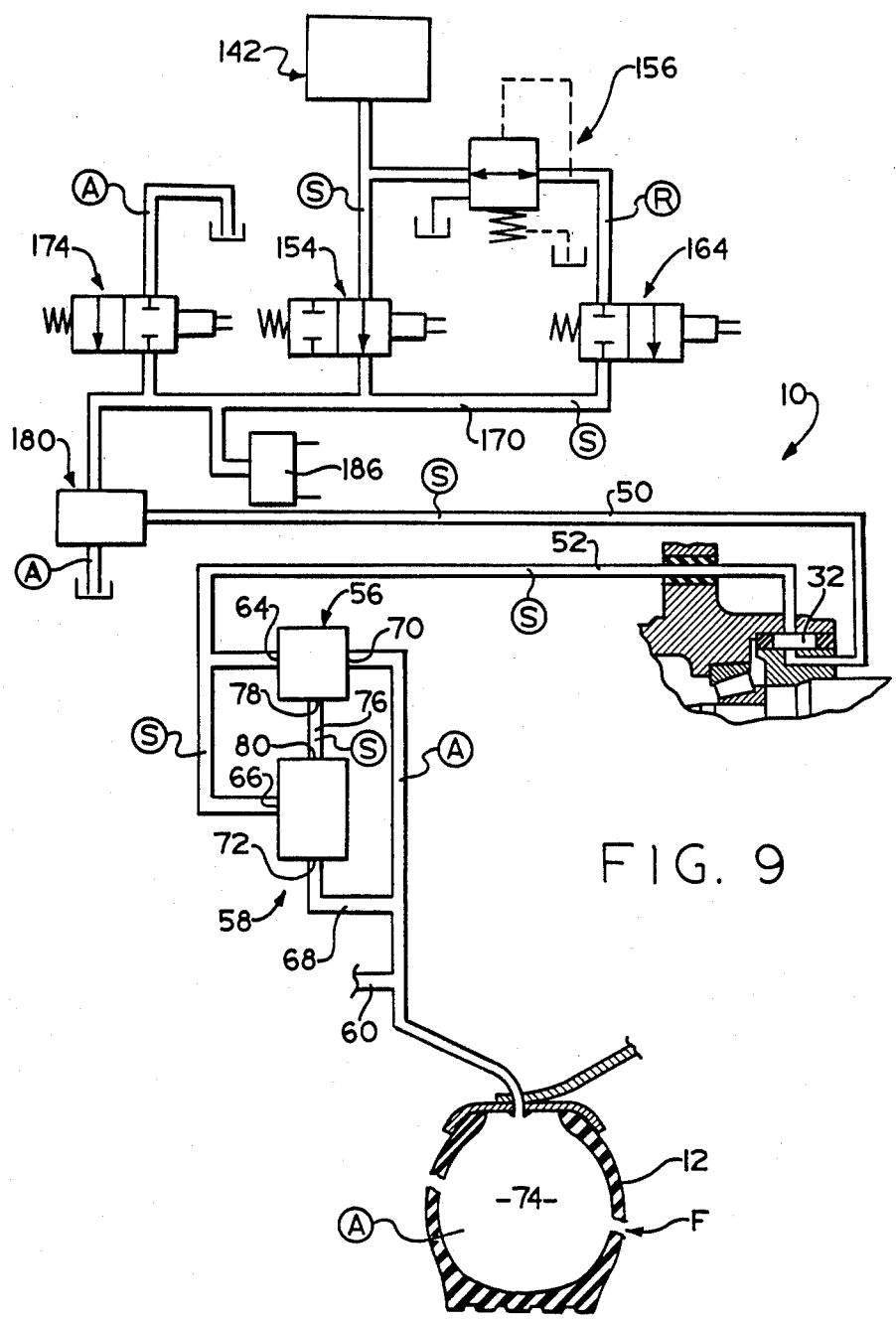
FIG. 9 is a schematic illustration of the pneumatic components of FIG. 1 illustrating the low tire pressure inflation prevention mode of operation.

The surface area 134 of diaphragm 122 exposed to tire pressure at port 70 is sized to be at least ten times as large a the surface area 140 of plug portion 138 of diaphragm 122 exposed to supply pressure at port 64. Accordingly, so long as at least a minimum pressure is present in tire chamber 74, even a ten times greater supply pressure in manifold portion 62 communicating with port 64 will not cause valve 56 to open communication between ports 64 and 78. Assuming the supply pressure at port 64 is never to exceed 110 psi, a pressure of greater than 10 psi in the tire and in conduit 68 will maintain valve 56 closed. However, in the event of extensive damage to tire 12 rendering the tire incapable of maintaining at least a minimum pressurization, pressurization of the supply conduit 62 will result in plug 138 moving off of valve seat 136 and fluidly communicating ports 64 and 78 which will cause supply pressure to be applied via conduit 76 to port 80 of the control valve 58, which supply pressure acting on the upper surface 110 of the diaphragm 90 of valve 58 will cause control valve 58 to remain in the closed position blocking communication between port 66 and 72 thus automatically isolating the damage tire. Thus, loss of system supply air through a damaged tire unable to maintain at least a predetermined minimum pressurization will be prevented allowing the remainder of the tire inflation system to inflate the remaining tires in a normal manner. This automatic damaged tire isolation mode of operation is illustrated in FIG. 9 and will be described in greater detail below. When the tire inflation system is shut down, pressure on top of the diaphragm 90 acting on surface 110 bleeds off around the outer periphery 94 and valve seat 92. Of course, for the system to operate, an initial tire pressure above the minimum tire pressure, 10 psi for example, must be provided to the tire 12 through the initial inflate and pressure check valve 60.

The initial inflate and pressure check valve 60 is located in manifold conduit 68, or may be located directly in the tire rim, and is located downstream of the valves 56 and 58 for direct fluid communication to the interior chamber 74 of tire 12. Initial inflate and pressure check valve is of a standard tire valve stem construction as is well known in the prior art.

It is important to note that control valve 58 and low tire pressure shutoff valve 56, which are both located at the wheel end assembly, utilize structures wherein venting to atmosphere of the various chambers thereof occurs solely through the manifold portion 62 of conduit 52, as will be described in greater detail below, and thus the valves 56 and 58 and will not be subject to clogging due to contamination by water, mud, snow or sand and/or may be located within the tire 12.

The relatively stationary portion 46 of the central tire inflation system 10 is mounted at convenient points on the vehicle chassis, preferably above the fording level of the vehicle, and is fluidly connected to the rotating portion 48 by means of a single conduit 50 and a single rotating seal chamber 32.

The relatively stationary portion 46 includes a source of pressurized fluid 142 which is typically the vehicle air system compressor, or, preferably, a pressurized air reservoir supplied by the compressor.

The source of pressurized fluid supplies compressed air, typically at a pressure not exceeding about 120 psi, to a split conduit 144 which defines branches 146 and 148 leading to the inlets 150 and 152, respectively, of inflate valve 154 and pressure regulator 156, respectively. Pressure regulator 156 defines an outlet 158 connected to a conduit 160 leading to the outlet 162 of deflate valve 164. The outlet 166 of inflate valve 154 and inlet 168 and deflate valve 164, respectively, are connected to a manifold conduit 170. Manifold conduit 170 is also connected to the inlet 172 of shutoff valve 174. Shutoff valve 174 has an outlet 176 connected to exhaust. Manifold conduit 170 is also connected to port 178 of quick-release valve 180. A pressure transducer 186 is exposed to the pressure in conduit 170 by means of a branch conduit 188.

Quick-release valve 180 defines a port 182 connected to exhaust and a port 184 connected to the conduit 50 leading to the wheel end assembly.

Pressure regulator 156 may be of any conventional design and will limit pressure flowing therethrough to conduit 160 to a relatively low pressure of about 8–10 psi, and further includes a relief port 190 leading to exhaust. Accordingly, it may be seen that the inlet 150 to the inflation valve 154 is exposed to supply pressure while the outlet 162 of deflate valve 164 is in communication with a regulated pressure of about 8–10 psi. As will be seen, pressure regulator 156 regulates the quick-release valve 180 and thus regulates the minimum pressure to which system 10 will deflate tire 12.

Inflate valve 154, deflate valve 164 and shutoff valve 174 are each relatively small flow two-way valves, preferably solenoid controlled valves, of conventional design. Valves 154, 164 and 174 have a first or closed position blocking fluid flow between the inlet and outlet ports thereof and a second or open position permitting fluid flow between the inlet and outlet ports thereof. Typically, the solenoid two-way valves 154 and 164 are spring biased to the closed positions thereof while valve 174 is spring biased to the open position thereof.

Figure 4:
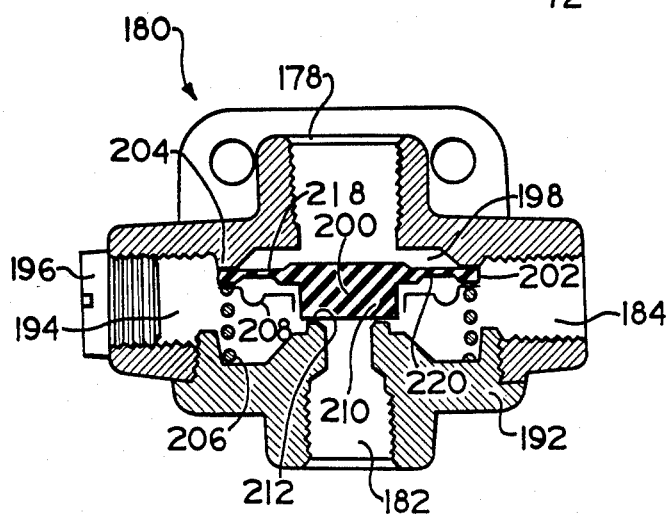
FIG. 4 is a sectional view of the quick release valve schematically illustrated in FIG. 1.

The detailed structure of quick-release valve 180 may be seen by reference to FIG. 4. Briefly, the structure of quick-release valve 180 is substantially identical to the structure of control valve 58 described above with the exception of not utilizing an exhaust restrictor 104 as is utilized in the valve 58. The valve 180 defines a valve body 192 having four ports, port 178 connected to manifold conduit 170, port 182 connected to exhaust, port 184 connected to conduit 50 and an unused port 194 sealed by a plug 196. The valve body 192 defines a central interior chamber 198 in which a plug type diaphragm 200 is received. The outer periphery 202 of diaphragm 200 cooperates with an annular valve seat 204 to control the flow of fluid between port 178 and 184. A spring 206 and spring retainer 208 are utilized to bias the outer periphery 202 into sealing contact with the valve seat 204. The central plug portion 210 cooperates with an annular valve seat 212 at port 182 to control the flow of fluid between ports 182 and 184. Diaphragm plug portion 210 is biased into sealing engagement with valve seat 212 by means of fluid pressure in conduit 170 acting on upper surface 218.

The operational characteristics of quick-release valve 180 are that a fluid flow (i.e. flow of higher pressurized fluid to a conduit or chamber at a lower pressurization) may be maintained from port 178 to port 184. However, a fluid flow may not be maintained from port 184 to port 178 as diaphragm 200 will lift to open port 184 to the exhaust port 182. Further, the valve 180, by establishing fluid communication from port 178 to port 184 and from port 184 to exhaust 182 will tend to cause the pressurization at port 178 (conduit 170) and the pressurization at port 184 (conduit 50) to equalize at the pressurization of the lower pressurized conduit.

It is important to note that quick-release valve 180, through which the various valves at the wheel end assemblies are vented, is located remote from the wheel end assembly and may also be located remotely from the control valves, solenoid valves 154, 164 and 174. Quick-release valve 180 may be remotely controlled by a single pressure line 170 fluidly connecting port 178 of valve 180 with the solenoid valves via manifold conduit 170. As will be described in greater detail below, for quicker exhausting of the system and/or quicker operation of wheel end valves 56 and 58, a separate quick release valve may be provided at each axle or for each wheel end assembly.

By controlling the pressurization in conduit 170, the minimum pressure to which conduits 50 and 52 and all chambers fluidly connected thereto will automatically be vented through the quick-release valve 180 is also controlled. During the deflation mode of operation of system 10, the quick-release valve will exhaust conduits 50 and 52, which are then connected to the tire chamber 74 through control valve 58, to a pressure equalling the regulated pressure from regulator 156. During system shut-down (steady state operation), tire chamber 74 is isolated from the conduit 52 by control valve 58 and conduit 170 is exhausted to atmosphere through shut-off valve 174 allowing conduits 50 and 52 and the seal chamber 32 to be exhausted to atmosphere through the quick-release valve 180.

The pressure transducer 186 may be of any commercially available design and provides a signal, preferably an electric signal, indicative of the pressure in conduit 170.

The operation of the pneumatic components of central tire inflation system 10 is as follows. Under normal or steady state conditions, i.e. when tire inflation system 10 is not activated, the interior chamber 74 of tire 12, and thus manifold conduit 68, will be pressurized to some pressurization level greater than the minimum pressurization level, such as, for example, 75 psi for highway travel, 30 psi for cross country travel or 20 psi for operation in sand, mud or snow. If the pressurization of tire 12 is below the minimum pressure level (such as 10 psi) the tire must be pressurized to at least a minimum pressurization level by means of the manual inflate and pressurization check valve 60. In the steady state condition (see FIG. 6), the inflation valve 154 and the deflate valve 164 are closed and the shutoff valve 174 is open. Under these conditions, supply pressure is present in conduit 144 and regulated pressure is present in conduit 160. As the shutoff valve is open, conduit 170 is vented and thus the upper surface 218 of the diaphragm 200 of quick release valve 180 is exposed to atmospheric pressure only. Whatever pressure may be present in conduits 62, 52 and 50 will be vented to atmosphere as a result of such pressure acting on the lower surface 220 of diaphragm 200 causing the plug 210 to disengage the valve seat 212 connecting conduit 50 to exhaust through ports 184 and 182 of quick-release valve 180. As manifold portion 62 of conduit 52 is vented to atmosphere, there will be only atmospheric pressure present in ports 64 and 66 of valves 56 and 58, respectively and thus ports 70 and 72 of valves 56 and 58, respectively will be sealed to isolate the conduit 68 and the tire 12 at tire inflation pressure from the remainder of the system. As conduits 52 and 50 are vented, or quickly become vented through quick-release valve 180, the rotary seals 28 and 30 defining seal chamber 32 are exposed to atmospheric or substantially atmospheric pressure on both sides thereof.

In FIGS. 6, 7, 8, 9, 10 and 11 the pressurization of the various conduits and/or chambers is indicated by an "S" for supply pressure, "R" for regulated pressure (8–10 psi), "A" for atmospheric pressure or "T" for tire pressure.

Figure 12:
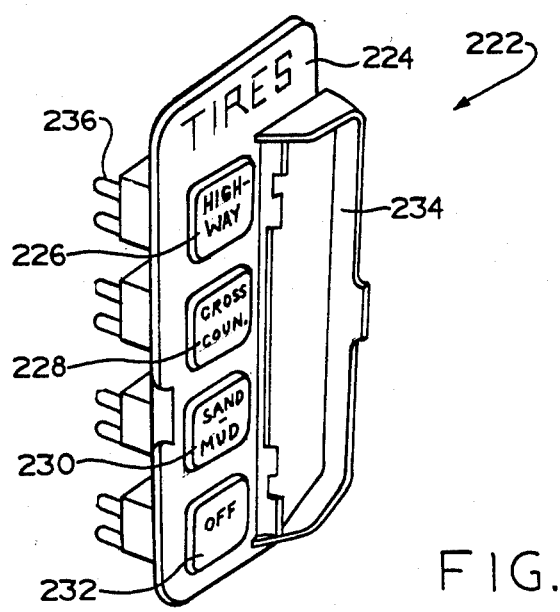
FIG. 12 is a prospective view of a possible operator control panel.
Figure 6:
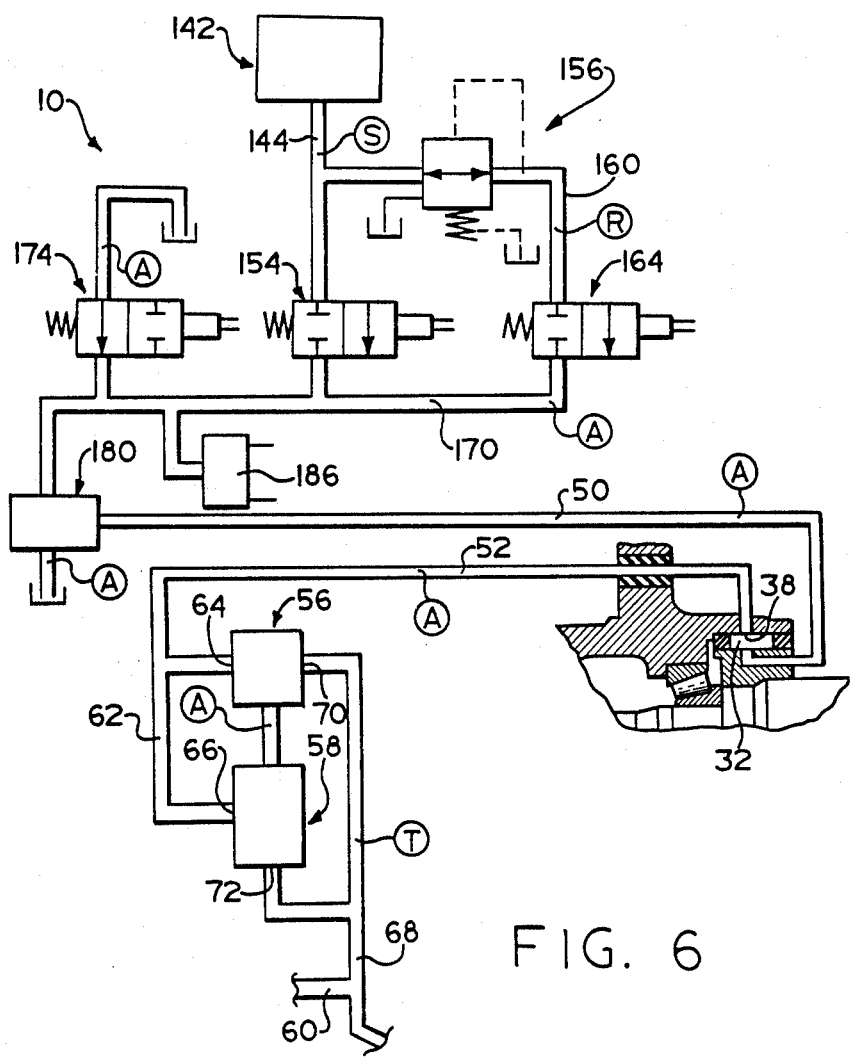
FIG. 6 is a schematic illustration of the pneumatic components illustrated in FIG. 1 during initial or steady state operating conditions.

Preferably, the operator is provided with a control panel 222 in the vehicle operating cab which control panel may be seen in greater detail by reference to FIG. 12. A typical control panel will include a panel body 224, preferably mountable in the vehicle dashboard, having a multiplicity (here shown as 4) of lightable push buttons 226, 228, 230 and 232. In the embodiment shown, push button 226 is marked "highway", push button 228 is marked "cross country", push button 230 is marked "sand, mud" and push button 232 is marked "off". Of course, additional control buttons may be provided and the operator may be provided with a gauge or LED or LCD readout indicating current tire pressure inflation and/or the operator may be provided with a control whereby a specific inflation pressure may be requested. The panel 222 includes a hinged blackout cover 234 for security purposes. Each of the control buttons includes connector means 236 for connection to a central control unit as will be described in greater detail below.

In one embodiment of control panel 222, a steady light at one of the buttons 226, 228 or 230 will indicate the pressure setting presently being maintained by the system 10. The operator may push another button and its light will blink until the new pressure is obtained at which time that button will glow steadily. If the operator pushes the off button 232, the control will select highway pressure and then deactivate the system and the off button will glow steadily. To provide maintenance of an operator or system selected pressure, the system will periodically monitor the pressure maintained in the various tires and take whatever corrective action (inflate or deflate) that is required to maintain said selected pressure. Insufficient air supply and/or other malfunctions may be indicative by blinking of the off button. As will be described in greater detail below, it is preferred that the control will sense vehicle speed and when the vehicle reaches a predetermined speed, such as 40 miles per hour, automatically inflate the tires to highway pressure and light the highway button 226. As a safety measure, the system will not respond to operator selection of cross country or sand-mud conditions by depression of buttons 228 or 230 above 40 miles per hour sensed vehicle speed.

When the operator selects an inflation pressure different from the current operating pressure, or during automatic periodic monitoring of current operating inflation pressures, the control unit must measure the current inflation pressures to determine if inflation and/or deflation is required to obtain or maintain the selected desired pressure.

Figure 7:
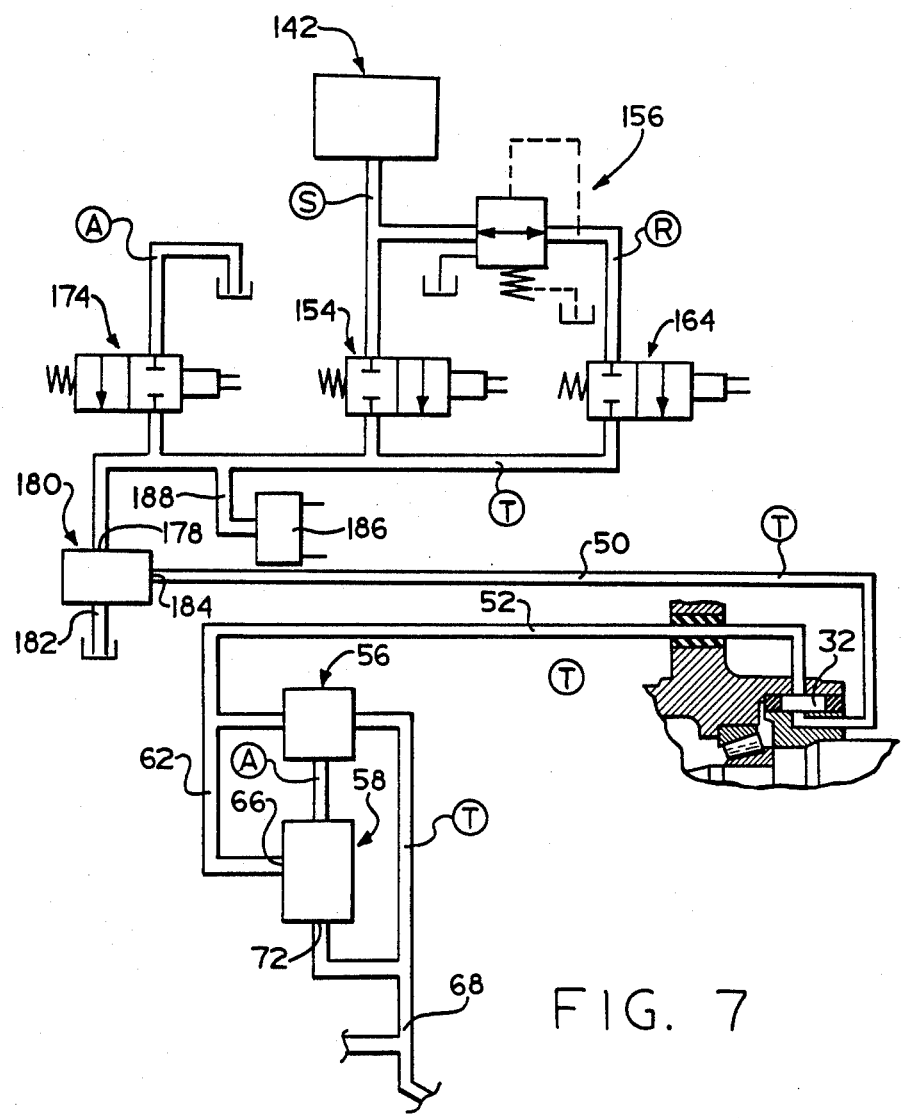
FIG. 7 is a schematic illustration of the pneumatic components of FIG. 1 during the tire pressure measurement mode of operation.

The pressure measurement mode of operation of system 10 is illustrated in FIG. 7. Briefly, the controller will close the inflate valve 154, the deflate valve 164 and the shut-off valve 174. The inflate valve 154 will then be quickly pulsed (i.e. quickly opened and then reclosed) which will cause supply air pressure to act upon the upper surface 218 of the diaphragm 200 of the quick release valve 180 thus pressurizing conduits 50, 52 and 62. Assuming the pressure in the tire and in conduit 68 is above the minimum pressure, the low tire pressure shut-off valve 56 will remain closed and the supply pressure at port 66 of the control valve 58 will act on the underside 110 of diaphragm 90 of valve 58 to open fluid communication between ports 66 and 72 of valve 58. Tire pressure in conduit 68 will retain the valve 58 in the open condition, and thus tire pressure or substantially tire pressure will be present in conduits 62, 52 and 50 and, by the action of quick-release valve 180, in conduits 170 and 188 leading to pressure transducer 186. Accordingly, pressure transducer 186 will be exposed to the tire pressure and will provide a signal indicative thereof to the control unit. It is understood, that for an accurate measurement of tire inflation pressure the system must be at equilibrium (i.e. with little or no fluid flow) which is the case with control valves 154, 164 and 174 in the closed positions thereof.

Figure 8:
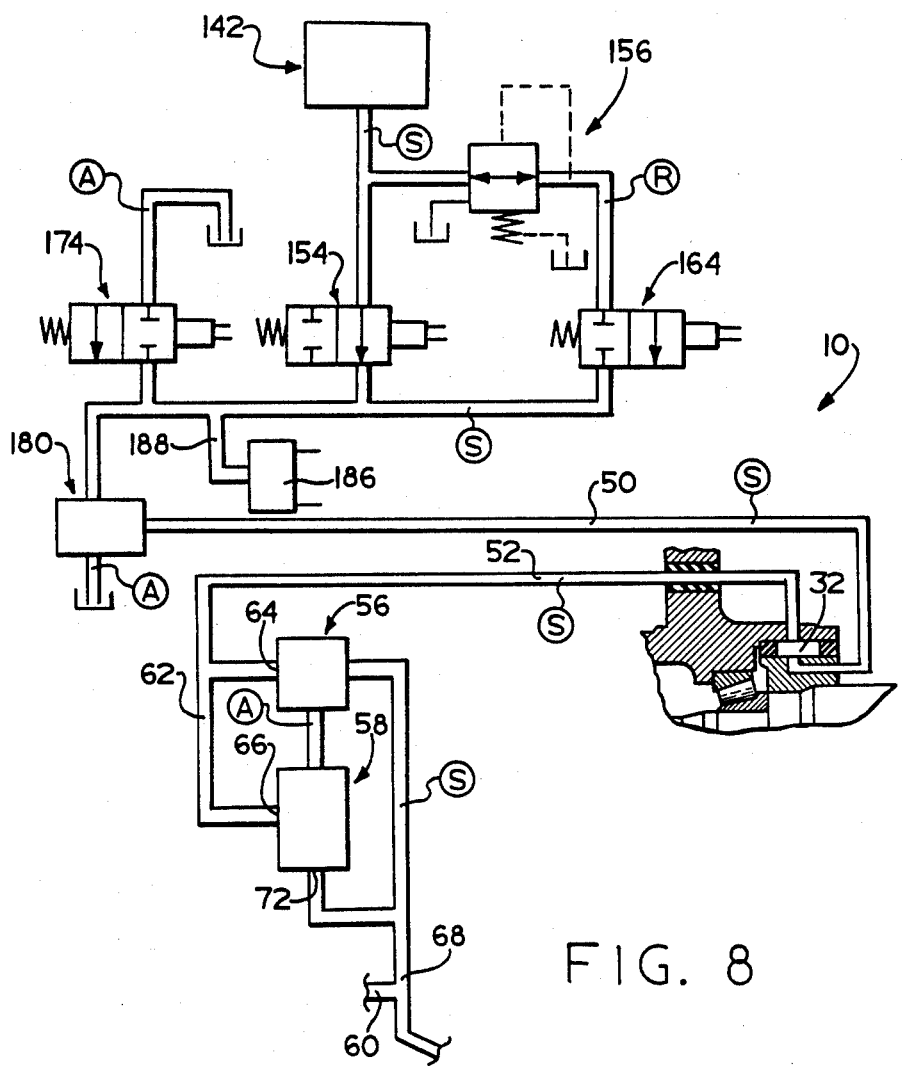
FIG. 8 is a schematic illustration of the pneumatic components of FIG. 1 in the tire inflation mode of operation.
Figure 10:
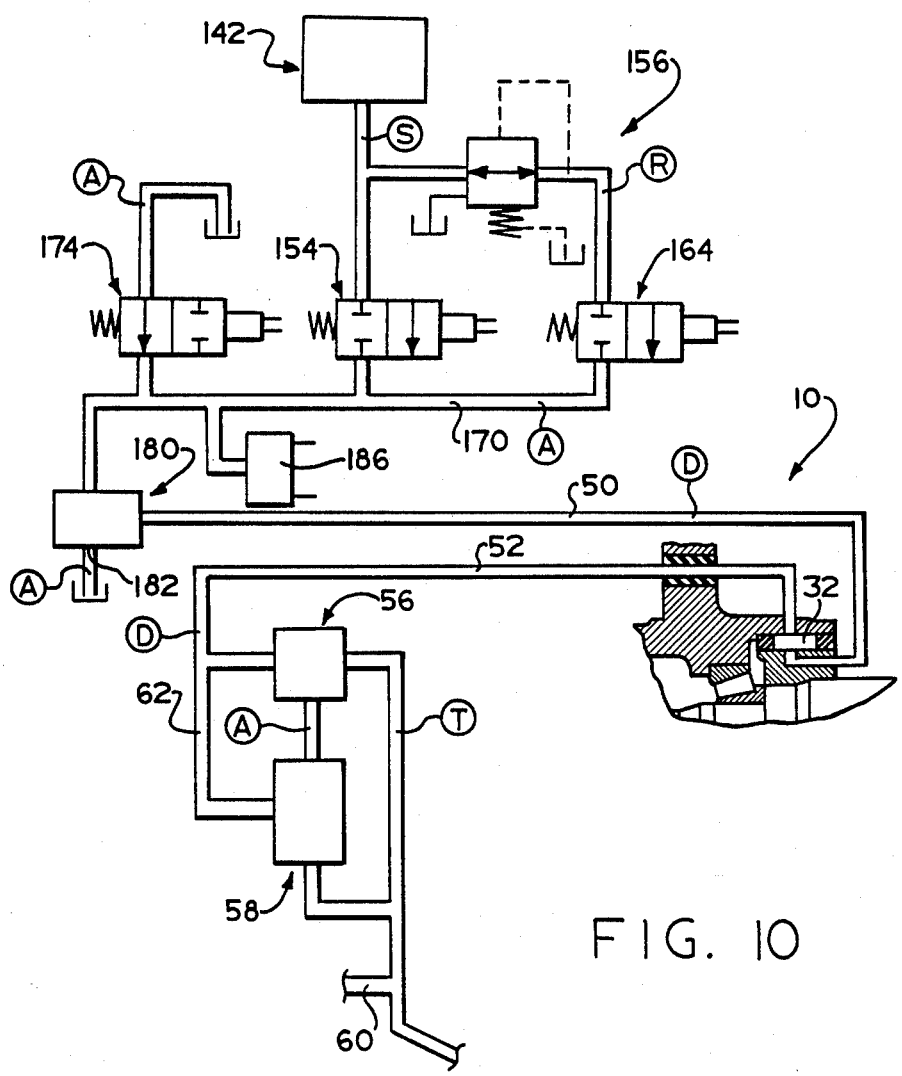
FIG. 10 is a schematic illustration of the pneumatic components of FIG. 1 during the system shutoff mode of operation.
Figure 11:
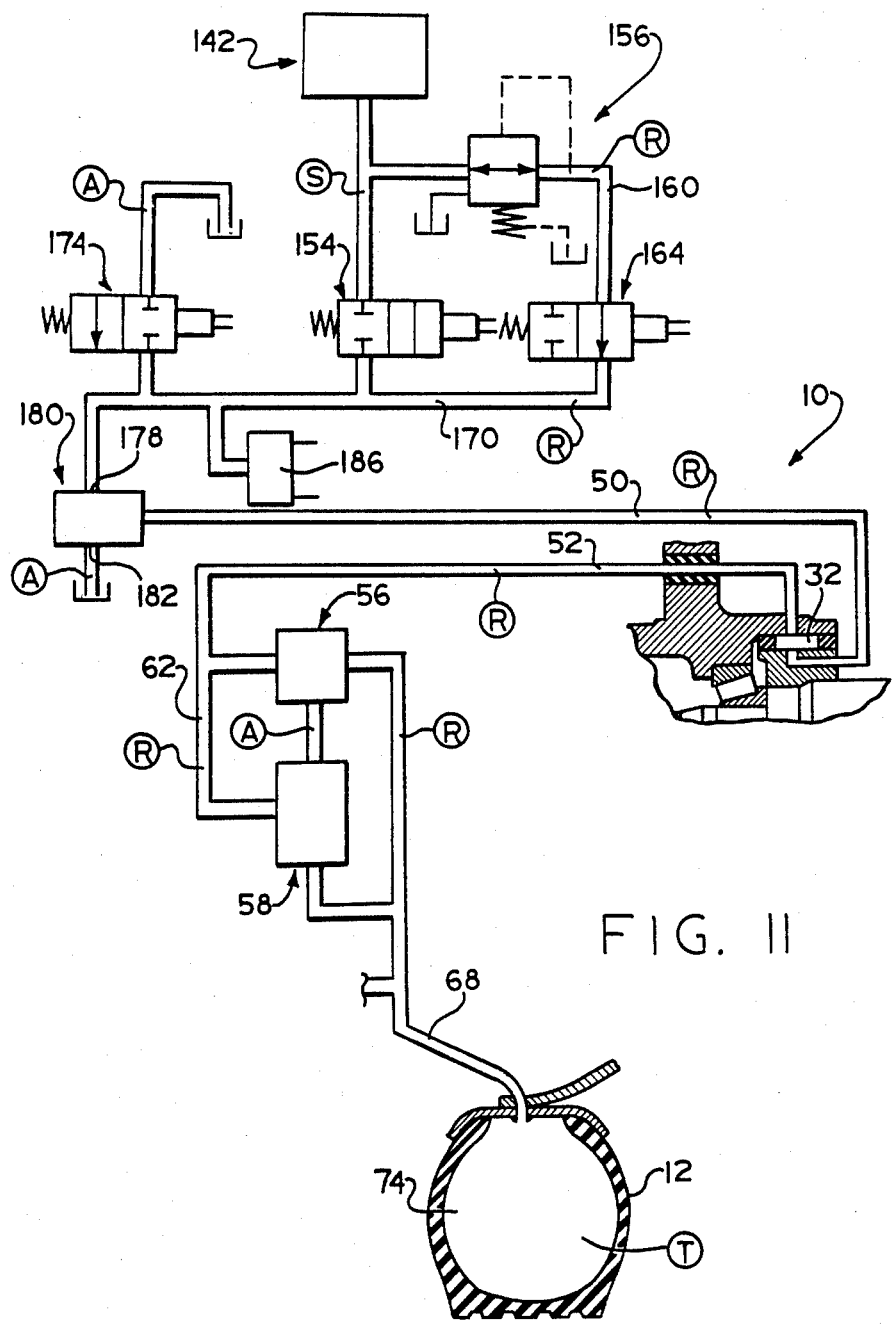
FIG. 11 is a schematic illustration of the pneumatic components of FIG. 1 during the tire deflation mode of operation.

The controller will then compare the present tire inflation pressure indicated by the signal from pressure transducer 186 to the desired tire pressure to determine if inflation or deflation is required. Should the controller determine that inflation is required, it will cause system 10 to assume its inflate mode of operation for a period of time as is illustrated in FIG. 8. Should the controller determine that deflation is required, it will cause the system to assume its deflate mode of operation as illustrated in FIG. 11. Should the controller determine that no action is required, it will cause the system to assume its system shut-off mode of operation as is illustrated in FIG. 10. Each of these modes of operation will be described in greater detail below.

If, based upon a comparison of current monitored tire inflation pressure and operator or controller selected desired pressure, the system control unit determines that inflation of the monitored tires is required, the system 10 will assume the inflation mode of operation illustrated in FIG. 8. In the inflate mode of operation, the deflate valve 164 and shut-off valve 174 are closed and inflate valve 154 is opened for a period of time. At the end of the period of time the inflate valve 154 is closed and the inflation pressure of the tire, which is present in conduits 60, 62, 52, 50, 170 and 188 is sensed by pressure transducer 186 to determine what, if any, further action is required. Opening of inflate valve 154 with the shut-off valve 174 and deflate valve 164 closed will result in supply pressure in manifold conduit 170 which supply pressure will flow around the exterior periphery of the diaphragm of quick-release valve 180 and into the conduit 50, through the rotary seal chamber 32, into conduit 52 and manifold portion 62 thereof and into ports 64 and 66 of valves 56 and 58, respectively. Assuming the inflation pressure present in conduit 68 is above the minimum inflation pressure, low tire pressure shut-off valve 56 will remain closed and fluid pressure at port 66 of control valve 58 will act upon the undersurface 112 of diaphragm 90 to open port 66 to port 72 for inflation of the tire 12 via conduit 68.

It is noted that a single pressure conduit path, conduit 52 is utilized to both open the control valve 58 and to inflate the tire 12, and that inflation occurs at full supply pressure for rapid inflation of tire 12. At the end of the period of time, the inflation valve 154 is closed. As the inflate valve is closed while retaining the shut-off valve and deflate valve in the closed condition, the control valve 58 will remain open and the quick-release valve 180 will allow tire inflation pressure to be monitored by the pressure transducer 186.

Upon obtaining an inflation pressure corresponding to the selected tire pressure (usually plus or minus a given percentage) the tire inflation system 10 will assume the shut-off mode of operation as illustrated in FIG. 10. In the shut-off mode of operation, the solenoid inflate valve 154 and deflate valve 164 are closed and the solenoid normally open shut-off valve 174 is open. Accordingly, manifold conduit 170 is exhausted to atmosphere, the pressure in conduits 62, 52 and 50 will rapidly exhaust to atmosphere via exhaust port 182 of the quick-release valve 180 causing the control valve 58 to close and the system 10 will assume the normal steady state condition illustrated in FIG. 6. As indicated above, to maintain a desired pressure, it is preferred that while in the steady state mode, the control unit will automatically periodically cycle through the system pressure measurement mode of operation illustrated in FIG. 7.

As discussed above, if one of the tires 12 suffers a catastrophic failure preventing the tire from maintaining at least the minimum inflation pressure (such as 10 psi) it is highly desireable to isolate that tire from the remainder of the central tire inflation system 10 so that the remaining tires may be inflated and/or deflated in a normal manner. The operation of the tire inflation system 10 with one of the tires inflated to below the minimum pressure may be seen by reference to FIG. 9. As may be seen, tire 12 has suffered a catastrophic failure "F" causing the inner chamber 74 thereof and manifold conduit 68 connected thereto to be essentially vented to atmosphere. Accordingly, chamber 70 of the low pressure shut-off valve 56 will be depressurized and only atmospheric pressure will act upon the upper surface 134 of diaphragm 122. As the inflation valve 154 is open, pressurizing conduit 62 and port 64 of valve 56, port 56 will be in fluid communication with port 78 causing conduit 76 and port 80 of control valve 58 to be pressurized, and thus supply pressure acting on the upper surface 110 of the diaphragm 102 of valve 58 will seal port 72 of the valve 58 from conduit 62 to isolate conduit 68 and tire 12 from the remainder of the inflation system 10.

Should the control unit of system 10 determine by the measurement mode of operation that deflation, of the tires is required, the system will assume the deflate mode of operation as seen in FIG. 11. In the deflate mode of operation, conduits 50 and 170 are initially at substantially tire pressure, the solenoid inflate valve 154 and the solenoid shut-off valve 174 are closed and the solenoid deflate valve 174 is open. Accordingly, regulated pressure, such as 10 psi, will be present in conduits 160 and 170 and at port 178 of the quick-release valve 180. The deflate valve 164 is open for a period of time. Opening of the deflate valve will maintain the regulated pressure on the top of the diaphragm 200 of the quick-release valve 180 while the conduits 50, 52, 62 and 68 will quickly bleed down toward the regulated pressure as the control valve 58 will remain open following the system pressure measurement mode of operation. As a pressure differential will exist between the interior chamber 74 of tire 12 and the conduit 68, the tire 12 will continue to deflate and air will be exhausted through the quick-release valve port 182. After the period of time, the deflate valve will be closed and system pressure will be measured to determine if further deflation and/or inflation is required. It is important to note that the pressure in conduit 170 and thus in port 178 of the quick-release valve will cause the quick-release valve to close and prevent further venting of the tire 12 below a predetermined regulated pressure which pressure is above the minimum pressure of the tire 12 which will cause opening of the low tire pressure shut-off valve 56.

An alternate tire valve assembly structure 300, which provides the combined functions of both the control valve 58 and the low tire pressure shut-off valve 56 described above, may be seen by reference to FIG. 13. Tire valve assembly 300 is housed in a single valve body or block 302 having only two exterior fluid connections or ports 304 and 306. Port 304 is fluidly connectable to a supply conduit 52 leading to the seal chamber 32 while port 306 is fluidly connected to the interior chamber 74 of tire 12. A fluid conduit (not shown) similar to manifold conduit 68 may be interposed port 306 and the interior chamber 74.

Valve body 302 defines a central valve chamber 308 divided into a lower portion 310 and an upper portion 312 by a plug type diaphragm 314. Port 304 fluidly communicates with the lower chamber portion 310 as does a shut-off shuttle valve assembly 316. The lower portion 310 of chamber 308 communicates with port 306 through a valve seat 318 which is opened and closed by the plug portion 320 of diaphragm 310. A spring 324 biases the plug portion 320 against the seat 318 with a force sufficient to maintain a blockage of fluid flow from port 306 to the lower chamber portion 320 and port 304 until tire pressure acting on surface 321 of the plug portion exceeds a predetermined maximum value.

Diaphragm 314 defines a lower surface 326 exposed to fluid pressure at port 304 and in the lower chamber portion 310 which surface is of a smaller surface area than the upper surface 326 of the diaphragm which is exposed to fluid pressure in the upper chamber portion 312.

Shuttle valve 316 includes a shuttle member 328 which is biased by a spring 330 to open fluid communication between interior ports 332 and 334 and includes a piston portion 336 exposed to tire pressure at port 306 and opposed to the spring to bias the shuttle leftwardly to block fluid communication between ports 332 and 334. Port 332 is fluidly connected to the lower chamber portion 310 and port 304 while port 334 is fluidly connected to the upper chamber portion 312. A pressure of above about 10 psi, the minimum reference tire pressure, at port 306 will be effective to maintain shuttle 328 in the leftward or closed position thereof to fluidly isolate the upper and lower chamber portions. A spring 340 biases the outer periphery 342 of the diaphragm 310 against the outer seat 344 between the lower and upper chamber portions. Upon venting of conduit 52 and lower chamber portion 312, the upper chamber portion will exhaust through valve seat 344.

Assuming the pressure at port 306 exceeds the minimum tire pressure, pressurization of conduit 52 will pressurize the lower chamber portion to lift the plug 320 off of seat 318 to establish fluid communication between conduit 52 and the interior chamber 74 of tire 12. Venting of conduit 52 will cause the plug 320, under the bias of spring 324, to seal the seat 318. However, if tire pressure is below the minimum tire pressure, spring 330 will cause shuttle 328 to be in its rightward or open position and pressurization of conduit 52 will cause the upper and the lower chambers, 310 and 312, to be pressurized and supply pressure on the larger area upper surface 328 of diaphragm 310 will retain the plug 320 firmly engaged with seat 318 to automatically fluidly isolate tire 12.

It is important to appreciate that valve assembly 300 is in a single body 302 which requires but two connections, at ports 304 and 306, and no venting to atmosphere other than through the port 304. These features allow the tire valve assembly to be mounted at a relatively protected location on the tire rim or hub or inside the tire chamber 74.

Figure 14:
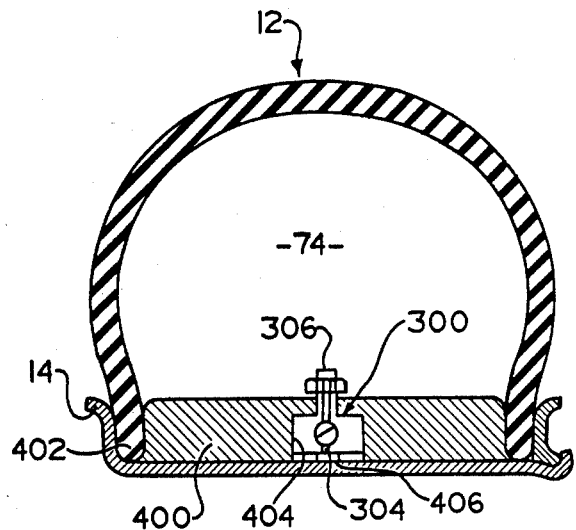
FIGS. 14 and 15 are sectional views of an alternate control and low tire pressure shut-off valve assembly mounting embodiment.
Figure 15:
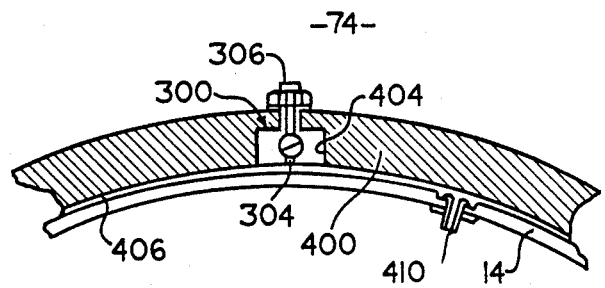

An alternate mounting of the control and low tire pressure shut-off tire valve assembly 300 may be seen by reference to FIGS. 14 and 15. In FIGS. 14 and 15, the tire 12 is mounted to a rim 14 to define a sealed interior chamber 74 by means of a bead lock 400. Bead locks such as bead lock 400 are well known in the prior art and are often utilized with tires expected to be operated at relatively low pressures to maintain the bead portion 402 sealingly engaged with the rims and to prevent the tires from spinning on the rims at low tire inflation pressure. The bead lock 400 illustrated is of a molded rubber sleeve construction and bead locks of this type are available from the Hutchinson Core Corp. of Trenton, N.J.

Figure 13:
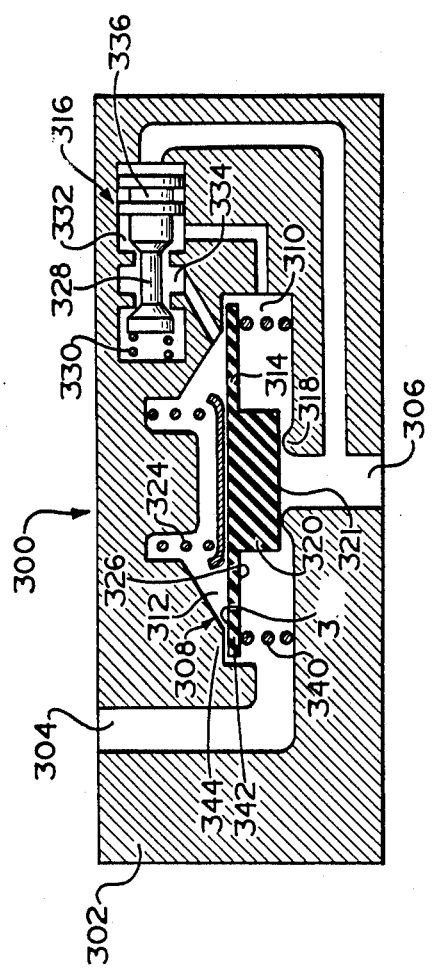
FIG. 13 is a schematic illustration of an alternate control valve and low tire pressure shut-off valve assembly.

The bead lock 400 is modified by providing a pocket or chamber 404 therein in which a valve assembly 300 is received. Valve assembly 300, as may be seen by reference to FIG. 13, is functionally identical to the control valve 58 and low tire pressure shut-off valve 56 described in detail above. Valve assembly 300 includes an inlet 304 port and an outlet 306 communicating with the interior 74 of the tire. The bead lock 400 is provided with an annular cavity or passage 406 communicating with the inlet port 304 of the valve assembly 300 and to a fitting 410 which is attachable to conduit 52. A separate manual initial pressurization and pressure check valve similar to valve 60 described above may be provided. Fitting 410 extends through an opening in rim 14.

Although the preferred embodiment of the present invention have been described with a certain degree of particularity, it is understood, of course, that certain substitutions for and rearrangement of the parts may be resorted to without departing of the spirit and the scope of the present invention as hereinafter claimed.

We claim:

1. A tire valve assembly for a central tire inflation system comprising an inflatable tire mounted on a tire rim by means of an annular bead lock to define an interior pressurized chamber and to define a fluid passage communicating with a fluid fitting extending through said tire rim for connection to a selectivity pressurized and exhausted conduit, said valve assembly comprising a valve body defining an exterior surface and an interior valving chamber, said valve body having only a first and a second fluid connection from the exterior surface to the interior valving chamber thereof, said first fluid connection defined by a first port for connection to said fluid passage, said second fluid connection defined by a second port for connection to the interior pressurized chamber of said inflatable tire, said valve body adapted to be mounted entirely within said pressurized chamber in a cavity provided in said bead lock, said valve assembly comprising first valve means within said valving chamber responsive to pressurization of said selectivity pressurized and exhausted conduit to assume a first position for establishing fluid communication between said first and second ports and responsive to exhausting to atmosphere of said selectivity pressurized and exhausted conduit to assume a second position for blocking fluid communication between said first and second ports thereof, said valve assembly comprising second valve means within said valving chamber constantly in fluid communication with said second port and responsive to a sensed pressurization of said interior chamber of said tire being less than a predetermined minimum reference pressure to automatically maintain said first valve means in said second position thereof regardless of the fluid pressure at said first port.

2. The tire valve assembly of claim 1, wherein said first valve means comprises a diaphragm having a first surface constantly exposed to fluid pressure at a said first port and an opposed second larger surface, and said second valve means comprises a shuttle valve having an open position for establishing fluid communication between said first port and said second diaphragm surface and a closed position for blocking fluid communication between said first port and said second diaphragm surface, fluid pressure acting on said second diaphragm surface tending to cause said first valve means to assume said second position thereof.

3. The tire valve assembly of claim 2, wherein said shuttle valve means includes a shuttle member constantly biased to said open position thereof by a resilient member and having a piston portion constantly exposed to pressure at a said second port, fluid pressure on said piston portion acting in opposition to said resilient biasing member to bias said shuttle valve to said closed position thereof.

4. The tire valve assembly of claim 1, wherein said valve body comprises a unitary block.

5. The tire valve assembly of claim 3, wherein said resilient biasing means is effective to overcome fluid pressure less than a predetermined minimum reference pressure acting on said piston portion.

* * * * *